Figure 1:
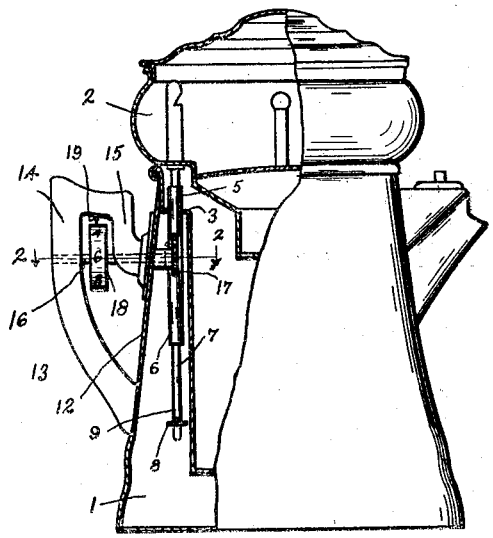

Oct. 18, 1932.  S. A. HAINES  1,882,821

FLUID FLOW CONTROL MEANS FOR COOKING UTENSILS

Original Filed April 14, 1930

INVENTOR.
Stacey A. Haines
BY
Day Oberlin & Day
ATTORNEYS

Patented Oct. 18, 1932

1,882,821

UNITED STATES PATENT OFFICE

STACEY A. HAINES, OF CHICAGO, ILLINOIS, ASSIGNOR OF ONE-HALF TO HAROLD F. SPENCER, OF KANSAS CITY, MISSOURI

FLUID FLOW CONTROL MEANS FOR COOKING UTENSILS

Application filed April 14, 1930, Serial No. 444,155. Renewed May 23, 1932.

My invention relating as indicated to fluid flow control means for cooking utensils, has specific reference to a means whereby the fluid delivery means employed to transfer variable quantities of fluid from one chamber to another in multi-chambered vessels can be accurately and easily controlled by means exteriorly of the utensil. My invention is particularly applicable to effect the adjustment of a movable fluid delivery conduit positioned on the interior of a vessel, the extent of immersion of the terminal portion of such conduit determining the quantity of fluid to be transferred from one chamber to another.

In cooking and brewing utensils having a plurality of chambers, the cooking or brewing operation is usually accomplished by transferring a predetermined quantity of boiling water or like fluid from the boiling chamber of the utensil to the infusion chamber thereof wherein the cooking or brewing takes place. The quantity of fluid required to be transferred usually depends upon the quantity of food or other material which is placed in the infusion chamber to be acted upon by the heated fluid. It becomes necessary, therefore, to effect an adjustment of the fluid delivery means to regulate the quantity of water or liquid to be transferred according to the quantity of material to be cooked or brewed. Frequently the quantity of food or other material prepared by the utensil varies for each separate operation, necessitating a frequent change in the adjustment of the fluid delivery means. In order, therefore, that such change in the adjustment of the fluid delivery means be accomplished readily, such utensil should have associated therewith an adjusting means for the fluid delivery device, be readily adjustable by the operator, and accurately indicate the extent to which such adjustment has been made.

Due to the fact that cooking and brewing utensils are commonly employed in association with a heating element and, therefore, the body of such utensils becomes heated, the adjusting means for the fluid delivery device should be so positioned with respect to the body of the utensil that a manipulation thereof can be effected by the operator without the employment of a heat insulating holder. It is further advisable to have such adjusting means located exteriorly of the utensil so as to be readily accessible and yet not interfere as a projection on the outer surface of a utensil is apt to do.

It is among the objects of my invention to provide a means for adjusting the fluid delivery conduit of a utensil, which means has all of the above named desirable characteristics. Other objects of my invention will appear as the description proceeds.

To the accomplishment of the foregoing and related ends, said invention, then, consists of the means hereinafter fully described and particularly pointed out in the claims, the annexed drawing and the following description setting forth in detail certain mechanism embodying the invention, such disclosed means constituting, however, but one of various mechanical forms in which the principle of the invention may be used.

Figure 3:
Figure 2:
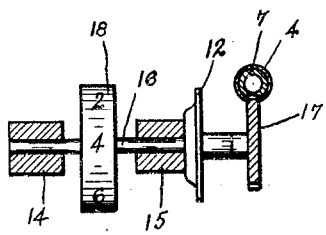
Figure 4:
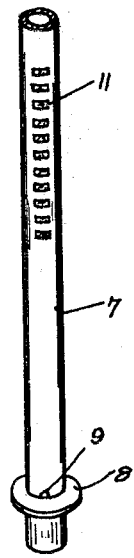

In said annexed drawing:

Fig. 1 is an elevational view of a brewing utensil with a portion thereof broken away to show the construction of the device comprising my invention; Fig. 2 is a partial sectional view of the structure illustrated in Fig. 1 taken on a plane substantially indicated by the line 2—2; Fig. 3 is a perspective view of the guide member shown in Fig. 1; and Fig. 4 is a perspective view of the adjustable fluid delivery conduit.

Referring more specifically to the drawing and more especially to Fig. 1, the utensil here illustrated consists of a boiling chamber 1 and an infusion chamber 2 which are separated by a partition member 3. It should be noted in connection with this figure that the principles comprising my invention are applicable to utensils other than the type here illustrated, which utensils may be of any multi-chambered form.

The partition 3 has mounted therein a guide member 4, a portion 5 of which may extend into the infusion chamber, and a portion 6 thereof into the boiling chamber. The guide member 4 here illustrated is tubular in form, although any other cross sectional form may be employed depending upon the cross sectional form of the fluid delivery conduit. Mounted co-axially within the guide member 4 and axially movable with respect thereto is a fluid delivery conduit 7 preferably of cross sectional form, similar to the form of the guide member 4. The fluid delivery conduit 7 has a circumferential flange 8 formed near the lower end thereof and an aperture 9 formed in its wall, which aperture is the means of egress of the fluid from the boiling chamber 1. The guide member 4 has an aperture 10 formed in the wall thereof, which aperture will lie opposite serrations 11 formed in the wall of the conduit 7.

The outer wall 12 of the boiling chamber 1 has a handle 13 of the common form secured thereto by means of which the utensil may be manipulated by the operator. In the outer portion 14 of the handle 13 and the inner portion 15 thereof which is secured to the wall 12 of the utensil, is journaled a shaft 16 which has terminally mounted thereon a pinion 17. Intermediately of the portions 14 and 15 of the handle 13 the shaft 16 has secured thereto a disk or wheel 18 bearing ordinals on the outer periphery thereof which ordinals are adapted to register with the indicating projection 19 formed on the handle 13. The pinion 17 engages the serrations 11 through the aperture 10 formed therefor in the guide 4 so that upon a rotation of the shaft 16 by means of the disk 18 axial adjustment of the fluid delivery conduit with respect to the guide member 4 can be had in either direction, depending upon the direction of rotation of the wheel 18.

The several elements above described will be assembled so that when the wheel 18 is turned to the position in which the ordinal 4, for instance, coincides with the indicating projection 19, the quantity of liquid between the horizontal plane of the flange 8 and the level to which the boiling chamber 1 is normally filled will be four cups or like units of measure. By filling the boiling chamber to the same level prior to each cooking or brewing operation the operator by rotating the wheel 18 to the proper position can accurately determine a quantity of liquid which will be transferred from the boiling to the infusion chamber. The described fluid delivery device and its associated control mechanism is applicable to be employed in connection with utensils which depend upon the thermo siphon principle for transferring the fluid from one chamber to another, and is likewise applicable to utensils which depend upon the steam pressure built up in the boiling chamber to force the water through the fluid delivery conduit from such chamber to another.

The construction of the adjusting mechanism comprising my invention is such that a free radiation of heat therefrom is possible at all times, therefore maintaining cool such adjusting means, which has apparent advantages. The position of the adjusting wheel and its associated shaft is likewise advantageous due to the support for such shaft afforded by the handle of the utensil, and further, the arrangement of the supporting means inside of the handle prevents damage thereto which might be possible were the adjusting means to extend from any other portion of the vessel.

A further description of the principles comprising my invention is believed unnecessary for those familiar with the art, suffice it to say that numerous detailed changes in construction may be effected without departing from the underlying principles of this invention.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In a utensil, the combination with a plurality of chambers, fixed guide means associated with the wall of one of said chambers, an aperture in the wall of said guide means, means movably supported by said guide means for transferring fluid from one of said chambers to the other, said transferring means having serrations coinciding with said aperture in said guide, means extending through said aperture and engaging said serrations for adjusting said fluid delivery means, and a control wheel associated with said adjusting means exteriorly of said utensil.

2. In a utensil, the combination with a plurality of chambers, of adjustable means for transferring variable quantities of fluid from one of said chambers to the other, a rack and pinion for adjusting said fluid delivery means, a shaft for said pinion extending exteriorly of said utensil, and means associated with said shaft for rotating said pinion, a handle for said utensil, said shaft supported at spaced points by said handle.

3. In a utensil, the combination with an inner and outer chamber, of adjustable means for transferring fluid from one of said chambers to the other, revoluble means extending exteriorly of such utensil for adjusting said fluid delivery means, said revoluble means including an index bearing wheel indicating the adjustment of said fluid delivery means, and means for supporting said revoluble means on opposite sides of said wheel.

4. In a utensil, the combination with inner and outer chambers, of adjustable means for transferring variable quantities of fluid from the outer chamber to the inner chamber, means for adjusting said fluid delivery means, said adjusting means including a revoluble member exteriorly of said utensil, and a handle for said utensil, said adjusting means movably supported at spaced points by said handle.

5. In a utensil, the combination with inner and outer chambers, of adjustable means for transferring variable quantities of fluid from one chamber to another, means exteriorly of said utensil for adjusting said delivery means, a handle for such utensil and a projection on said handle adjacent said control means indicating the degree of said adjustment.

6. In a utensil, the combination with inner and outer chambers, of a handle for such utensil, adjustable fluid delivery means for transferring variable quantities of fluid from one of such chambers to the other, a shaft revolubly mounted in said handle extending interiorly of said utensil, a control and indicating means mounted on the exterior portion of such shaft, and a pinion mounted on the interior portion of said shaft for adjusting said fluid delivery means.

Signed by me this 4 day of April, 1930.

STACEY A. HAINES.